United States Patent
Stephan et al.

(10) Patent No.: US 6,615,632 B1
(45) Date of Patent: Sep. 9, 2003

(54) PARTING TOOL

(75) Inventors: Roland Stephan, Riesa (DE); Joachim Schlegel, Freiberg (DE); Wilfried Förster, Gröditz (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/714,750

(22) Filed: Nov. 16, 2000

(30) Foreign Application Priority Data

Nov. 16, 1999 (DE) .......................................... 199 56 954

(51) Int. Cl.$^7$ ............................................... B21B 13/20
(52) U.S. Cl. ................................ 72/71; 72/103; 29/417
(58) Field of Search ................................ 72/70, 71, 72, 72/102, 103, 104; 29/240, 426.4, 426.5, 417

(56) References Cited

U.S. PATENT DOCUMENTS 4,084,303 A * 4/1978 Skinner .......................... 72/71

FOREIGN PATENT DOCUMENTS

| DE | 31 17 200 A1 | 12/1982 | | |
|----|---|---|---|---|
| DE | 197 08 473 A1 | 8/1998 | | |
| SU | 533435 | * 10/1976 | .................... | 72/71 |
| SU | 680793 | * 8/1979 | .................... | 72/71 |
| SU | 761100 | * 9/1980 | .................... | 72/71 |
| WO | WO 95/29777 A1 | 11/1995 | | |

* cited by examiner

*Primary Examiner*—Ed Tolan
(74) *Attorney, Agent, or Firm*—Henry M. Feiereisen

(57) ABSTRACT

A parting tool for continuous chipless separation of identical parts from a rotation-symmetric workpiece, includes a cutting roller having a main body advancing a workpiece in a transport direction from an entry side to an exit side. The main body has a slip bevel at the entry side and a cutting screw including a screw thread having coils which define a helix line and are configured with an increase in height. The screw thread includes in series an entry portion, a substantially cylindrical primary portion and a separating portion, whereby the coils in the entry portion, primary portion and separating portion having different slope angle, with the slope angle determined by a combination of a thickness of the screw thread and a root width between two neighboring coils of the screw thread, wherein the increase in height of the coils correlates to the helix line.

31 Claims, 8 Drawing Sheets

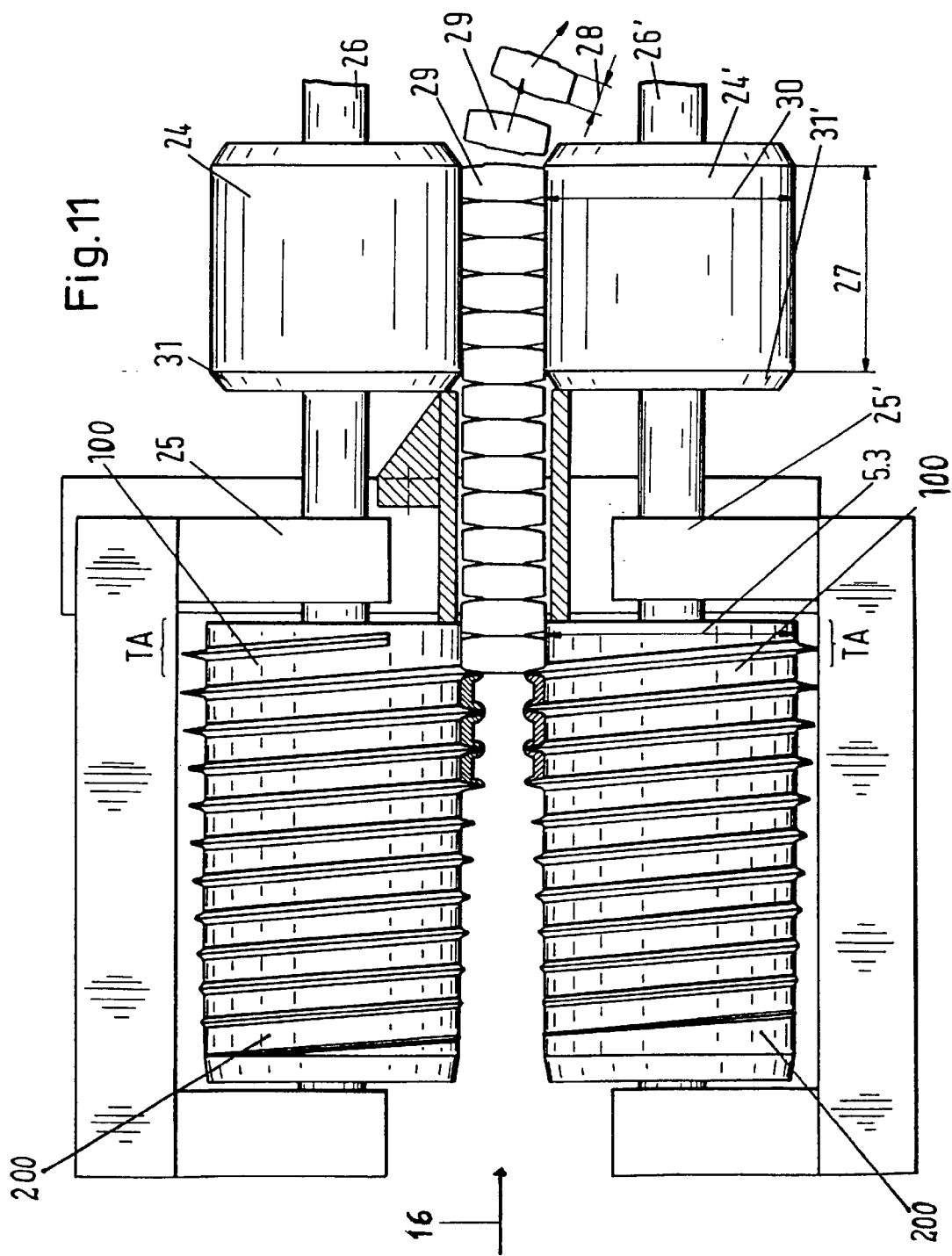

PARTING TOOL

CROSS-REFERENCES TO RELATED APPLICATIONS

This application claims the priority of German Patent Application Serial No. 199 56 954.1, filed Nov. 16, 1999, the subject matter of which is incorporated herein by reference.

BACKGROUND OF THE INVENTION

The present invention relates to a parting tool for continuous chipless separation of identical parts from a rotation-symmetric workpiece.

International PCT patent application WO 95/29777 describes a parting tool for the continuous chipless separation of single identical rings from tubular workpieces. The parting tool includes three cutting rollers which are driven in a same direction and arranged around the tubular workpiece being worked on. The cutting rollers are interconnected through positive engagement, with each cutting roller including a cylindrical main body which has axial ends defining a slip bevel and a calibrating portion, respectively, and a screw thread with thread-shaped cutting edges disposed between the slip bevel and the calibrating portion. The cutting edges include, as viewed in longitudinal section, a pointed cutting head and a cutting foot with flanks that are oriented substantially perpendicular to the respective roller axis. The flanks have a width which increases from entry to exit. The contour in the bottom land between the cutting edges of the cutting roller is substantially parallel to the roller axis, and the diameter of each cutting roller increases from beginning toward the end.

This conventional parting tool suffers shortcomings because it fails to take into account the radial material flow so that the fabrication of blanks from the workpiece with precise shape (straight, flat end faces and accurate cylindrical surface area) cannot be realized or only realized at great expenditure. As the ridge formation cannot be influenced in a desired manner, the material loss during subsequent mechanical processing of the blank is substantial. Calibration, i.e. implementation of a precise end diameter of the blank, can be realized only to a limited extent and is dependent on the wear of the cutting rollers and on the roller adjustment. This conventional parting tool is also incapable to fabricate blanks with an outer diameter that is greater or smaller than the outer diameter of the initial rotation-symmetrical workpiece. Moreover, this conventional parting tool is subject to high wear so the its service life is inadequate.

A conventional parting tool of a type involved here is shown, for example, in FIG. 1. The parting tool includes a cutting roller 10 (only a section thereof is shown here for ease of illustration) having a screw thread 12 with coils, whereby each coil has a cutting head 13 of pointed configuration. This is disadvantageous as indicated by the cross section of the produced blank 11 because during cutting operation, material migrates into the space created by the pointed configuration of the screw thread 12 and results in the formation of lobed ridges 14, 14' on the produced blank 11, resembling the shape of half of a hysteresis loop. This leads to high material loss during subsequent mechanical treatment and longer processing times. Moreover, the feed of blanks 11 into the processing machine is more difficult as the blanks 11 may interlock as a consequence of the pointed ridge configuration.

In conventional parting tools, the cutting roller is so configured that the calibrating portion forms an integral part of the cutting roller. This is, however, disadvantageous because a wear of this portion requires a replacement of the entire cutting roller.

SUMMARY OF THE INVENTION

It is thus an object of the present invention to provide an improved parting tool, obviating the afore-stated drawbacks.

In particular, it is an object of the present invention to provide an improved parting tool which is less susceptible to wear and thus exhibits a long service life and yet is capable to produce blanks of high quality with precise shape and to keep a material loss to a minimum.

It is still another object of the present invention, to provide an improved parting tool which is capable to produce blanks with an outer diameter that can be greater or smaller than the outer diameter of the processed rotation-symmetrical workpiece.

According to one aspect of the present invention, a parting tool includes a cutting roller having a main body advancing a workpiece in a transport direction from an entry side to an exit side, with the main body having a slip bevel at the entry zone and a calibrating portion at the exit zone and a cutting screw disposed between the slip bevel and the calibrating portion and including a screw thread having coils which define a helix line and are configured with an increase in height, whereby the screw thread includes in series an entry portion, a substantially cylindrical primary portion, a separating portion and the calibrating portion, with the coils in the entry portion, primary portion, separating portion and calibrating portion having different slope angle, with the slope angle determined by a combination of a thickness of the screw thread and a root width between two neighboring coils of the screw thread, wherein the increase in height of the coils correlates to the helix line.

A parting tool in accordance with the present invention is able to consider the radial material flow and to attain an optimal blank shape as the space between neighboring coils of the screw thread up to the bottom land of the main body is sufficiently filled. At the same time, pressure on the flanks of the coils is reduced as a same pressure is applied on both sides of the flanks so that the screw thread is exposed to reduced wear and the service life of the cutting roller is extended.

The individual parts of the cutting roller assume the following functions:

a) Slip Bevel

Centers and guides the entering rotation-symmetrical workpiece.

b) Entry Portion

Commencement of the cutting thread portion, with the first coils intended to grab the workpiece and to apply a tension force on the workpiece. Preferably, the root diameter in this portion slightly increases, i.e. it is slightly conical.

c) Primary Portion

In this portion, the height of the coils significantly increases. This portion represents the start of the actual separation process, with formation of the ridge at the end face. This portion is long enough to just about effectuate a cutting of the workpiece.

d) Separating Portion

Typically, this portion is provided with one or more coils to ensure that even when the coils wear off, resulting in a decrease of the coil height, a secure cutting operation of the workpiece is accomplished. This portion results in a final formation of the end faces.

e) Calibrating Portion

In this portion, the final outer diameter of the blank is established and the exact cylindrical shape is ensured. Typically, this portion is devoid of any coils, although in special cases coils may be provided. The root diameter of this portion is slightly greater than the root diameter of the preceding separating portion. A kind of "pre-calibration" may also be established in the preceding separating portion.

In the description, the term "root diameter" in the respective portion will denote the diameter of the main body, bounding the root or base of the screw thread.

According to another feature of the present invention, the screw thread defines an ascending line which is tangent to the crests of the coils in the entry portion and a transition to the primary portion, whereby the ascending line extends substantially perpendicular to the helix line. This positively influences the size of the created ridge and the wear behavior of the screw thread.

The material displacement may also be optimized when suiting the root diameter in the entry portion, the primary portion, the separating portion and the calibrating portion to the cutting roller at hand. Suitably, the root diameter in the individual portions remains constant, whereas the main body of the cutting roller steadily increases in transport direction.

According to another feature of the present invention, the bottom land defined between neighboring coils of the screw thread may be slightly conical or asymmetrically concave, with the ascending section extending in transport direction of the cutting roller.

The type of ridge formation is especially impacted by the configuration of the top land of the coils. Suitably, the coils of the screw thread in the entry portion, primary portion, separating portion and calibrating portion have different top lands. For example, the top land in the entry portion and the top land in the primary portion may be pointed at an acute angle of <90 degrees, and the top land in the separating portion and the top land in the calibrating portion may be flat. Another variation includes the configuration of the top land of the coils in the entry portion in the form of a double-pointed tip.

Depending on the application at hand, it may be suitable to configure the top land in the entry portion and the top land in the primary portion with one-sided pointed tip, whereby the tips of some coils face the entry zone and the tips of some other coils face away from the entry zone, with the change in orientation occurring after every 360° with a transition zone.

According to another aspect of the present invention, a parting tool assembly includes a pair of cutting rollers disposed above one another at formation of a gap for passage of a workpiece in a transport direction, each said cutting roller including a main body having axial ends defining an entry zone and an exit zone, respectively, with the main body having a slip bevel at the entry zone and a cutting screw disposed in succession of the slip bevel and including a screw thread having coils which define a helix line and are configured with an increase in height, with the screw thread including in series an entry portion, a substantially cylindrical primary portion in succession of the entry portion, and a separating portion disposed at the exit zone, wherein the entry portion, primary portion and separating portion have different slope angle, with the slope angle determined by a combination of a thickness of the screw thread and a root width between two neighboring coils of the screw thread, wherein the increase in height of the coils correlates to the helix line; bearing members for supporting the axial ends of the main body, and at least two exchangeable calibrating rollers disposed in transport direction behind the bearing member at the exit zone of the cutting rollers.

In this manner, the calibrating portion is divorced from the cutting roller so that the separating portion forms the end of the cutting roller. The main body of each cutting roller is supported on a shaft, whereby one of the calibrating rollers may be positively connected with the shaft of one of the cutting rollers and another one of the calibrating rollers may be resiliently and loosely supported on the shaft of the other one of the cutting rollers. As a result, it is possible to use pressure-applying rollers to so adjust the axial disposition of the resilient calibrating roller that the blank exits the parting device at a smaller dimensional tolerance of the outer diameter.

Suitably, the diameter of the calibrating roller is greater than the root diameter of the separating portion of the cutting roller by at least 2%, and the width of the calibrating roller is greater than a width of each produced blank cut from the workpiece. Preferably, the width of the calibrating roller is twice as wide than the width of each of the produced blanks. Whether separate calibrating rollers or integrated calibrating portion are involved, same considerations apply for realizing an optimum width.

To further minimize wear, the cutting roller may be made of multiple parts, whereby the single portions are made of different materials. Suitably, the slip bevel and the entry portion are made of a material of high wear resistance, and the primary portion and the separating portion are made of conventional hot-working steel. An example for such hot-working steel includes a grade of steel with the designation X 32 CrMoV 3.3 with a hardness in the range of 48 to 51 HRC. An example for a material with increased wear resistance includes a special grade of steel with the designation thyrotherm 2999 EFS Supra with a hardness in the range of 54 to 57 HRC, a high resistance to temperature fluctuations and a high resistance to wear as a result of heat.

Of course, the cutting roller may also be configured of single-piece construction, whereby different strength and toughness may be implemented through application of particular coats. The main body may be of uniform construction, with the entry portion, primary portion and separating portion being applied on the main body as layers of different materials. For example, the slip bevel and the entry portion may include a thick layer applied through surfacing by welding a powder of a hard material alloy with high wear resistance. It may also be possible to apply on the entry portion and/or, optionally, on the calibrating portion, a thin layer made of a hard material alloy, e.g. TiAlN, applied by a sputtering process.

According to another feature of the present invention, the various portions of each cutting roller may have different surface structure to attain further improvements. For example, the calibrating portion may have a polished surface structure, whereas the other portions may have a milled surface structure. Also, the selected surface structure may be combined with a suitable type of coating.

All described measures result individually or in combination in an improvement of the radial material flow and to a reduction in wear and thus to an increase of the service life of the cutting rollers. Moreover, the embodiment of a parting tool with separate calibration permits the production of blanks that have an outer diameter which is greater or smaller than the diameter of the initial workpiece.

BRIEF DESCRIPTION OF THE DRAWING

The above and other objects, features and advantages of the present invention will be more readily apparent upon reading the following description of preferred exemplified embodiments of the invention with reference to the accompanying drawing, in which:

FIG. 11 is a longitudinal section of still another embodiment of a parting tool according to the present invention.

DETAILED DESCRIPTION OF PREFERRED EMBODIMENTS

Figure 1:
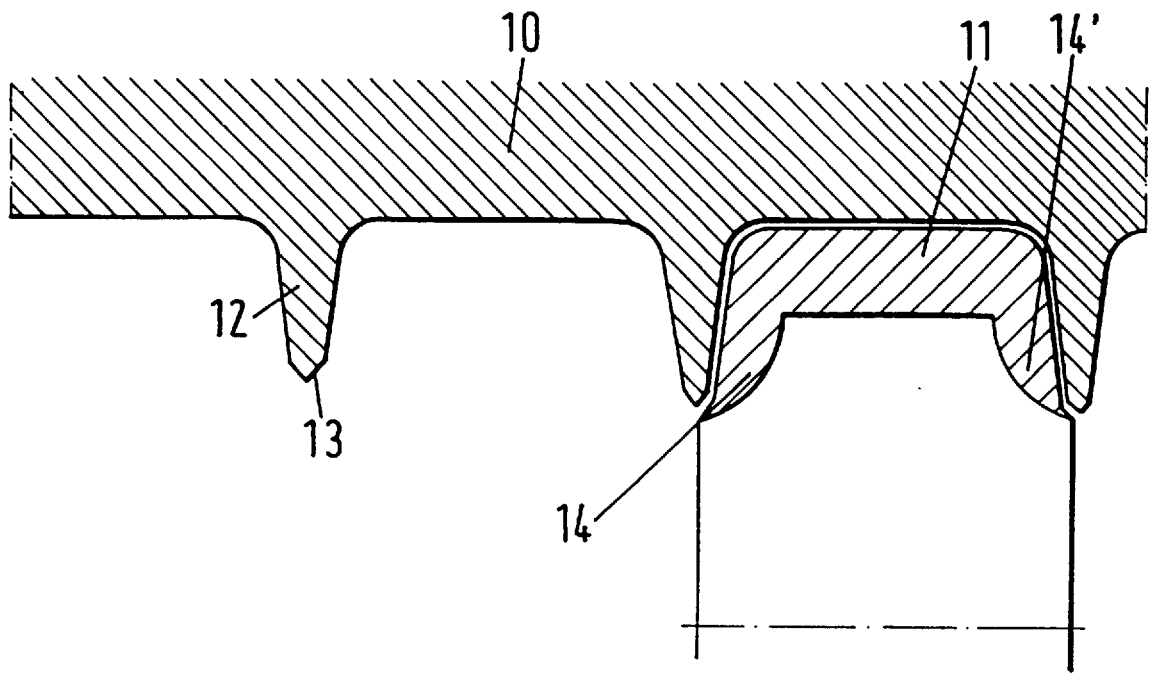
FIG. 1 is a schematic illustration of a conventional parting tool to show the ridge formation of a produced severed blank.

Throughout all the Figures, same or corresponding elements are generally indicated by same reference numerals.

Figure 2:
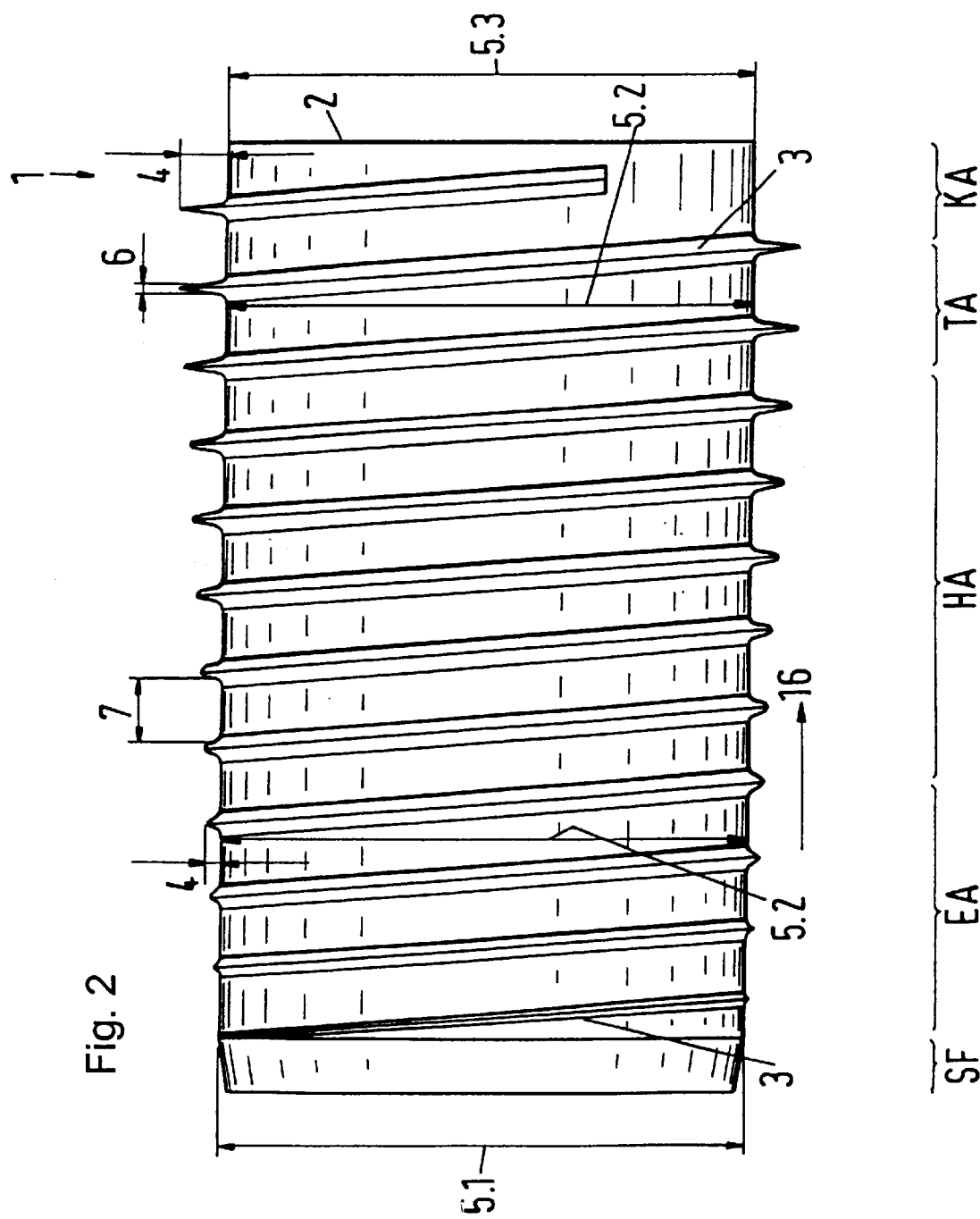
FIG. 2 is a longitudinal section of a cutting roller of a parting tool according to the present invention.

Turning now to the drawing, and in particular to FIG. 2, there is shown a longitudinal section of a cutting roller of a parting tool according to the present invention, generally designated by reference numeral 1, for cutting blanks 15 (FIG. 5) from a rotation-symmetric workpiece (not shown here) advancing in a transport direction 16. The cutting roller 1 includes a main body 2 which is subdivided in different portions between an entry side and an exit side, as viewed in transport direction 16, and includes a helix or screw thread 3. At its entry side, the main body 2 has a slip bevel SF of pronounced conical configuration. Following the slip bevel SF is an entry portion EA, which terminates in a primary portion HA. Following the primary portion HA is a separating portion TA which terminates in a calibrating portion KA.

Figure 5:
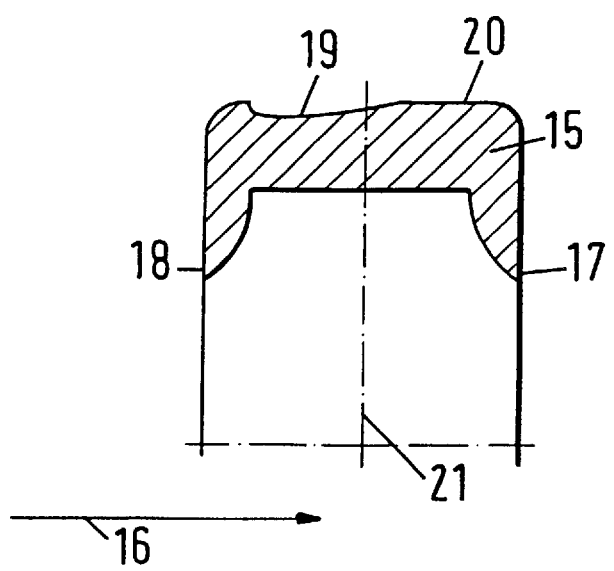
FIG. 5 is a sectional view of a blank produced by a parting tool according to the present invention.

The individual portions SF, EA, HA, TA, KA assume the following functions in the overall process: The slip bevel SF, devoid of coils, is intended to center and guide the incoming workpiece. The entry portion EA represents the beginning of the screw thread 3. In the entry portion EA, the workpiece is grabbed and tensed. In the primary portion HA, the height 4 of the coils of the screw thread 3 increases and the actual separation process commences. Hereby, as shown in FIG. 5, the blank 15 is formed at its end faces with inner ridges 17, 18 as a consequence of a separation without support. As viewed in transport direction 16, the leading ridge 18 has a more pronounced shape as the trailing ridge 17. In addition, the blank 15 has an outer peripheral surface area 20 which is formed with an indentation 19 which is disposed eccentric to the center axis 21 and points in opposition to the transport direction 16.

The primary portion HA is so dimensioned as to just about realize a separation of the blanks 15. The subsequent separating portion TA is formed with one or more coils to ensure that even at a wear of the coils, resulting in a diminishing of the coil height 4, a severance of the blanks 15 is ensured. The separating portion TA also provides the end faces of the blank 15 with the final shape. The calibrating portion KA may or may not have coils, and is intended to establish the blank 15 with a precise calibration of the outer diameter and a precise cylindrical shape. The width of the calibrating portion KA should be greater than the width of the blank 15 being severed. Suitably, the width of the calibrating portion KA is twice as wide as the width of the blank 15.

The main body 2 has a diameter which differs over the length of the cutting roller 1. At the junction from the slip bevel SF to the entry portion EA, the main body 2 has a diameter 5.1 which slightly increases to a diameter 5.2 at the end of the entry portion EA. Thus, the entry portion EA is slightly conical. The diameter of the main body 2 in the primary portion HA and separating portion TA remains constant and thus has the diameter 5.2, whereas in the calibrating section KA, the diameter of the main body 2 increases to the diameter 5.3 which slightly exceeds the diameter 5.2 of the preceding separating portion TA.

Figure 3:
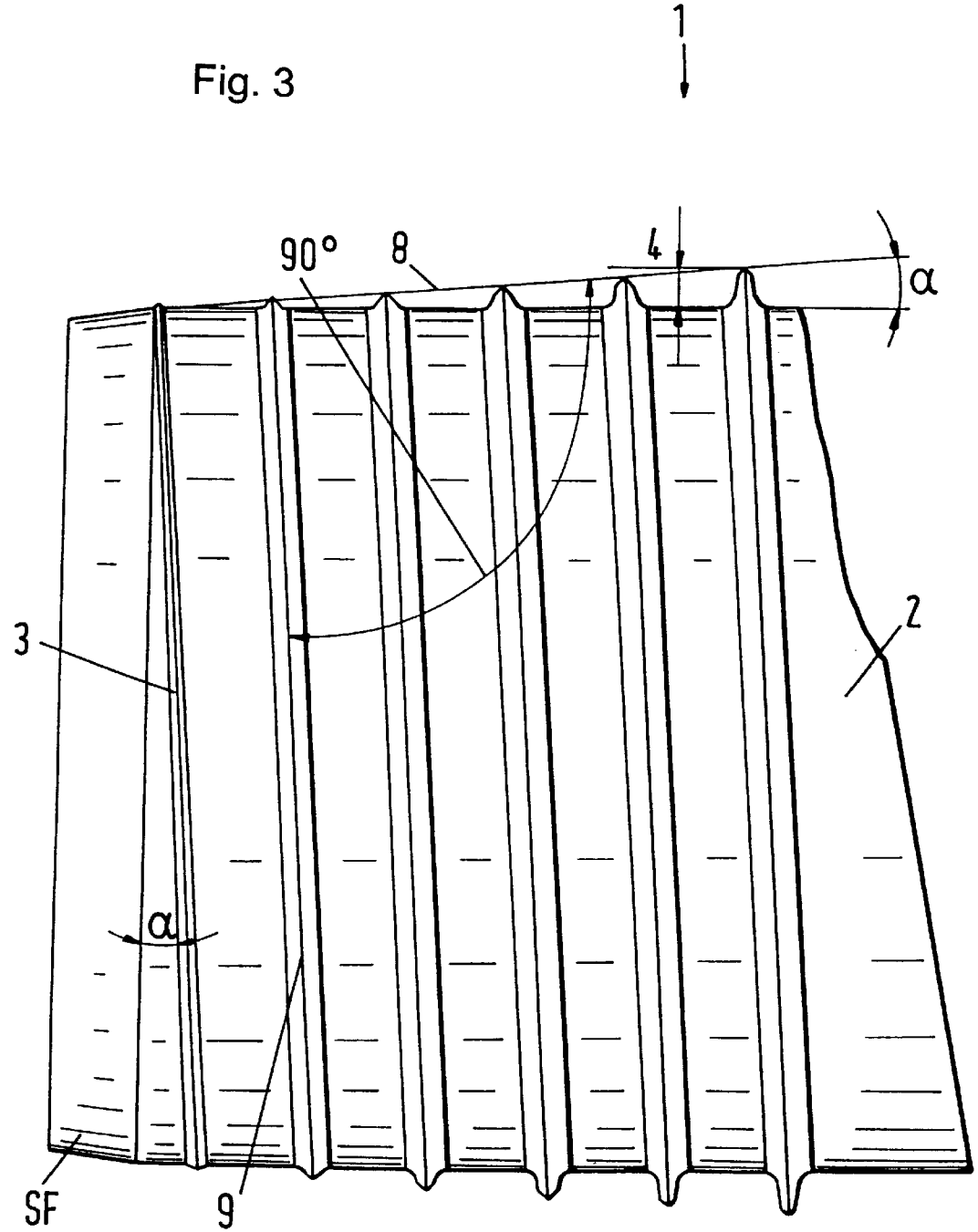
FIG. 3 is a cutaway view, on an enlarged scale, of the parting tool of FIG. 2, showing a relationship between height increase of the coils and angle of slope of the screw thread.

FIG. 3 shows, on an enlarged scale, the increase in height 4 of the coils of the screw thread 3 so as to define an ascent at a slope angle $\alpha$ which is governed by a combination of coil thickness 6 (FIG. 2) and root width 7, i.e. the distance between two successive coils of the screw thread 3. The slope angle $\alpha$ of the screw thread 3 in the various portions is different, as shown in FIG. 2. In the entry portion EA, the coil thickness 6 increases significantly as the root width 7 decreases. In the primary portion HA, the coil thickness 6 and the root width 7 stay constant, and increases in the separating portion TA the coil thickness 6 decreases as the root width 7 increases.

FIG. 3 shows the correlation between increase of the coil height 4 and the ascent (slope angle $\alpha$) of the coils. In accordance with the present invention, the straight ascending line 8 which is tangent to the crests of the coils extends perpendicular to the helix line 9 of the screw thread 3. The described dependency is established only for the area of the entry portion EA and a transition to the primary portion HA.

Figure 4:
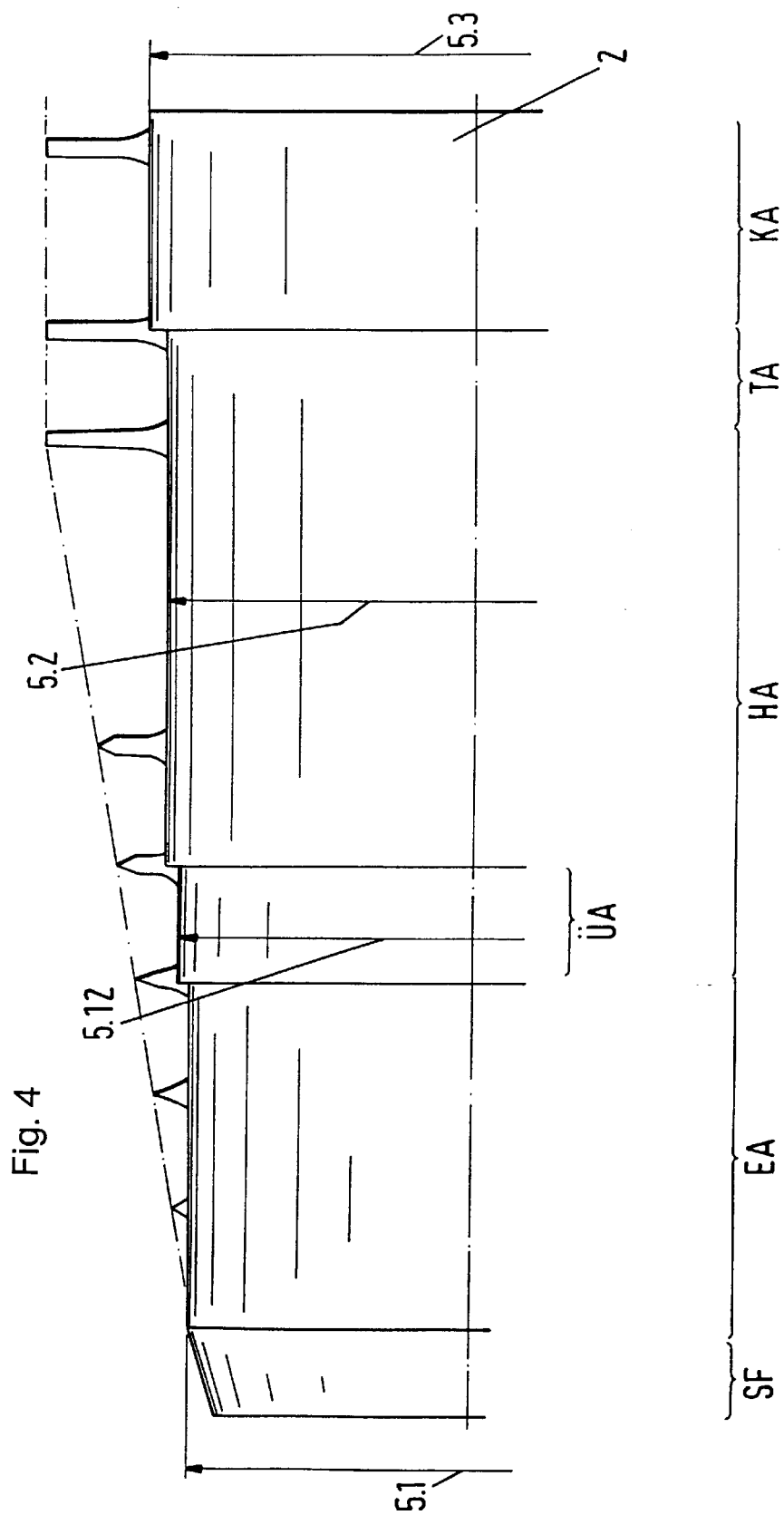
FIG. 4 is a schematic illustration of a modified parting tool.

FIG. 4 shows a principal illustration of a main body 2 of stepped configuration, whereby the various portions EA, HA, TA, KA have constant diameter. The entry portion EA has a diameter 5.1 which is identical to the maximum diameter of the slip bevel SF. The primary portion HA has a diameter 5.2 which is greater than the diameter 5.1 in the entry portion EA, whereby a transition zone ÜA is provided between the entry portion EA and the primary portion HA for the diametrical jump, with the transition zone ÜA having a diameter 5.12 which represents a mean value between the diameter 5.1 of the entry portion EA and the diameter 5.2 of the primary portion HA. In the separating portion TA, the main body 2 has also the diameter 5.2. The next diametrical jump is encountered at the junction to the calibrating portion KA, whereby the main body 2 has in the calibrating portion KA a diameter 5.3 which is slightly greater than the diameter 5.2 in the primary portion HA.

Figure 6:
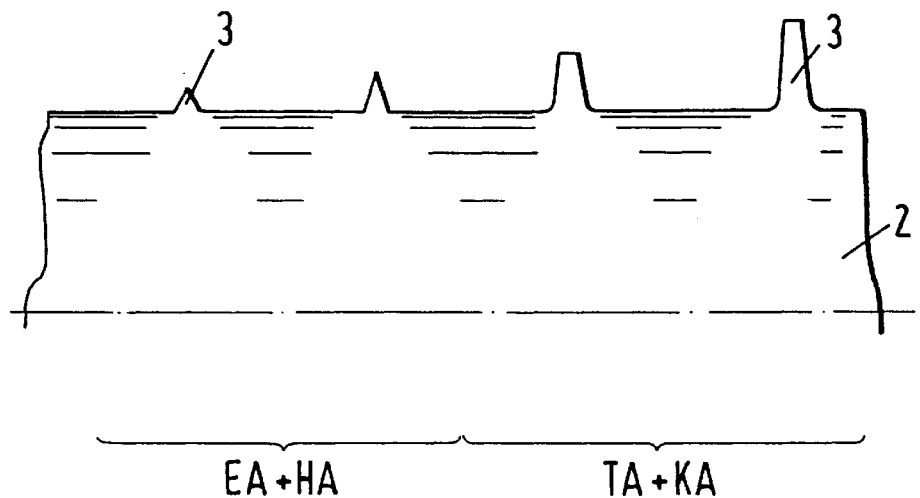
FIG. 6 is a schematic illustration of another configuration of the screw thread of a parting tool according to the present invention.
Figure 7:
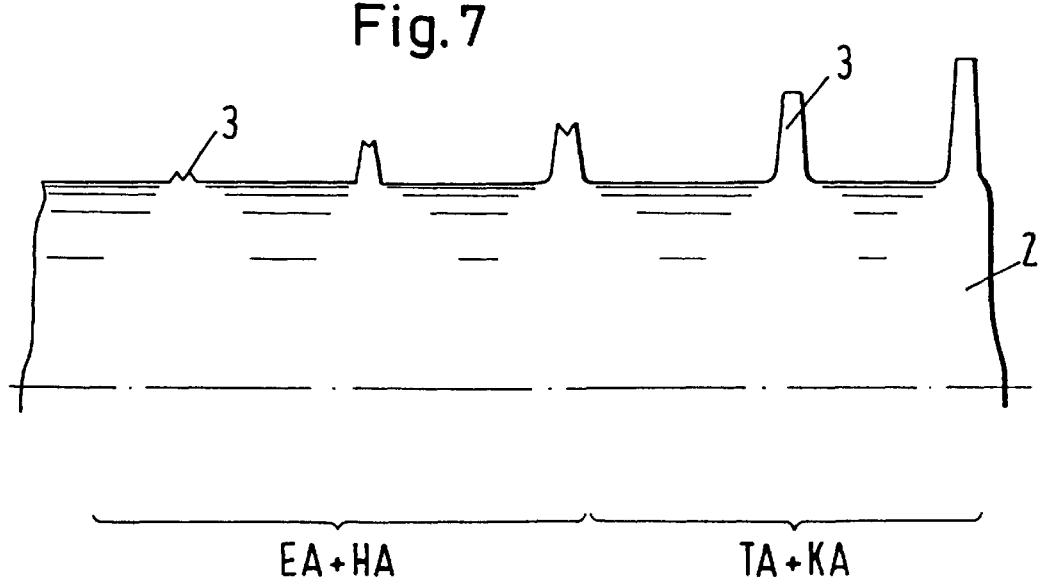
FIG. 7 is a schematic illustration of still another configuration of the screw thread of a parting tool according to the present invention.

Turning now to FIGS. 6–10, there are shown partial longitudinal sections of various embodiments of the screw thread 3. In FIG. 6, the coils of the screw thread 3 in the entry portion EA and the primary portion HA have a pointed top land, whereas the coils of the screw thread 3 have a flat top land in the separating portion TA and the calibrating portion KA. As a consequence of the flat shape of the screw thread 3 in the separating portion TA and the calibrating portion KA, the lobed ridge formation, encountered in conventional parting tools and shown in FIG. 1, is eliminated. FIG. 7 shows a variation of the main body 2 in which the coils of the screw thread 3 in the entry portion EA and the primary portion HA are formed as a double-pointed tip.

Figure 8:
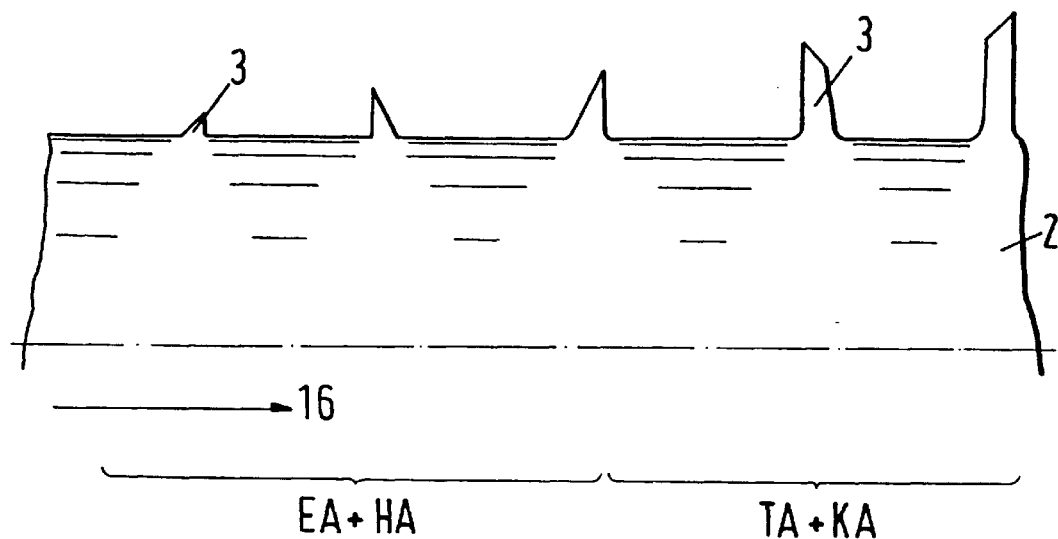
FIG. 8 is a schematic illustration of still another configuration of the screw thread of a parting tool according to the present invention.

FIG. 8 shows another embodiment of the main body 2 in which the coils of the screw thread 3 have a one-sided pointed shape, whereby in transport direction 16, the coils are so arranged that the pointed ends of some coils face the entry side and some of the coils face away from the entry side, whereby the change occurs after each 360° with a transition zone.

Figure 9:
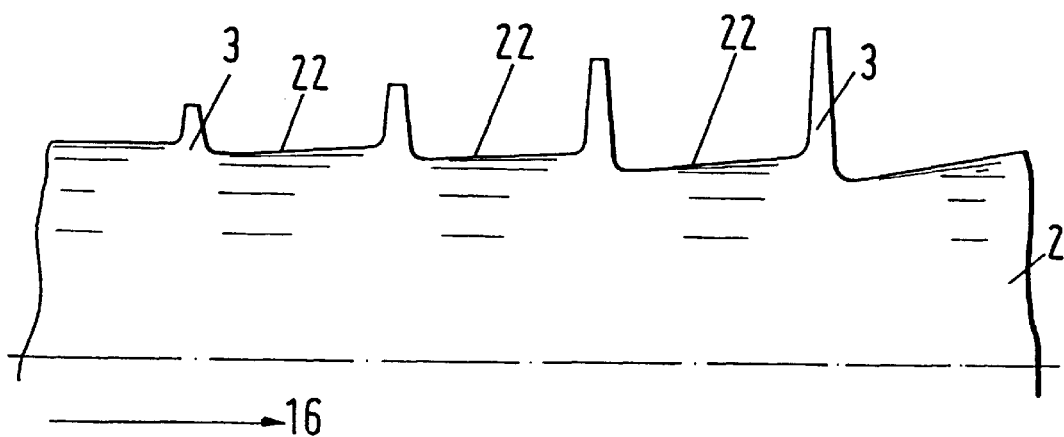
FIG. 9 is a schematic illustration of still another configuration of the screw thread of a parting tool according to the present invention.
Figure 10:
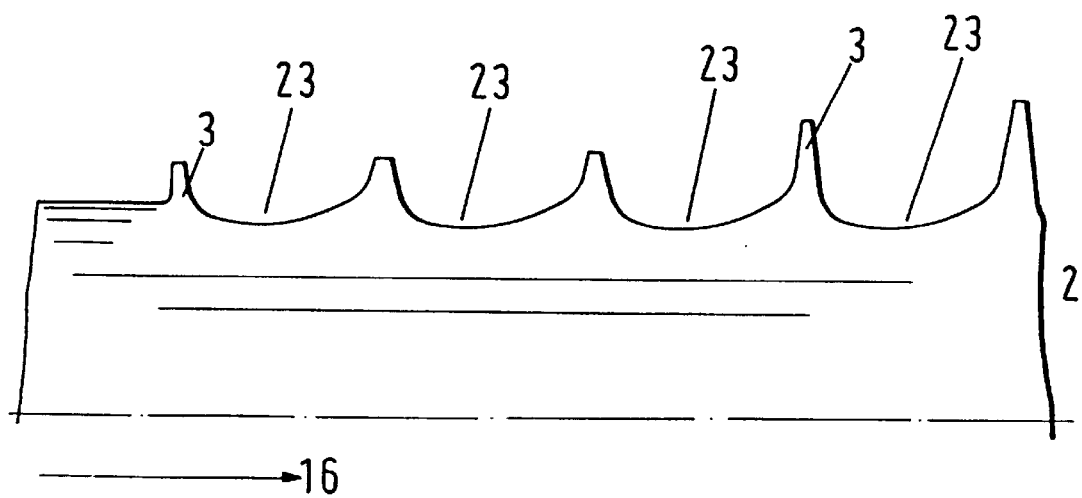
FIG. 10 is a schematic illustration of still another configuration of the screw thread of a parting tool according to the present invention.

In order to improve the radial material flow, the outer surface area 22 of the main body 2 is varied alternatively or additionally. As shown in FIG. 9, the outer surface area 22 of the main body 2 between the individual coils of the screw thread 3 is slightly conical, with the ascent extending in transport direction 16. Persons skilled in the art will understand that the conical form in FIG. 9 is shown exaggerated for ease of illustration. In FIG. 10, the main body 2 has a concavely shaped outer surface area 23 which is asymmetric between the coils of the screw thread 3 and also slightly ascends in transport direction 16.

Turning now to FIG. 11, there is shown a longitudinal section of another embodiment of a parting tool according to the present invention, including two cutting rollers 100 in superimposed relationship to form a gap therebetween for passage of a rotation-symmetric workpiece which is being cut into single blanks 29. Unlike the cutting rollers 1, as shown in FIG. 2, each cutting roller 100 has a main body 200 with terminates in transport direction 16 in the separating portion TA, whereas the calibrating portion KA is here replaced by at least two calibrating rollers 24 on either side of the workpiece. The calibrating rollers 24 are not disposed immediately behind of the separating portion TA, as viewed in transport direction 16, but are disposed behind bearings 25 for the cutting rollers 100. The calibrating rollers 24 are respectively mounted on shafts 26 which drive the cutting rollers 100. Suitably, one of the calibrating rollers, for example the upper calibrating roller 24, is mounted positively on the associated shaft 26, while the other one of the calibrating rollers, for example the lower calibrating roller 24, sits loosely with play on the associated shaft 26.

Through the provision of pressure-applying rollers (not shown), the axial disposition of the loosely mounted calibrating roller 24 may be modified to thereby change the calibration measure. Suitably, the width 27 of the calibrating rollers 24 is greater than the width 28 of the severed blank 29, preferably twice as wide. Further, the ratio between the diameter 30 of each of the calibrating rollers 24 to the diameter 5.3 of the separating portion TA is of relevance here, whereby practice has shown that the diameter 30 should exceed at least by 2% the diameter 5.3. In order to facilitate grabbing of the severed blanks 29, the calibrating rollers 24 have a conical ramp surface 31.

While the invention has been illustrated and described as embodied in a parting tool, it is not intended to be limited to the details shown since various modifications and structural changes may be made without departing in any way from the spirit of the present invention.

What is claimed as new and desired to be protected by Letters Patent is set forth in the appended claims:

1. A parting tool for continuous chipless separation of identical parts from a rotation-symmetric workpiece, comprising a cutting roller having a main body advancing a workpiece in a transport direction from an entry side to an exit side, said main body having a slip bevel at the entry side and a cutting screw including a screw thread having coils which define a helix line and are configured with an increase in height, said screw thread including in series an entry portion, a substantially cylindrical primary portion and a separating portion, whereby the coils in the entry portion, primary portion and separating portion having different slope angle, with the slope angle determined by a combination of a thickness of the screw thread and a root width between two neighboring coils of the screw thread, wherein the increase in height of the coils correlates to the helix line.

2. The parting tool of claim 1, wherein the main body has a calibrating portion at the exit zone, with the cutting screw disposed between the slip bevel and the calibrating portion, said entry portion, primary portion, separating portion and calibrating portion having different slope angle.

3. The parting tool of claim 1 wherein in the entry portion the main body has a thickness which increases whereas the root width between neighboring coils decreases, wherein in the primary portion the main body has a constant thickness and a constant root width between neighboring coils, and wherein in the separating portion the main body has a thickness which decreases whereas the toot width between neighboring coils increases.

4. The parting tool of claim 1 wherein the screw thread defines an ascending line which is tangent to the crests of the coils in the entry portion and a transition to the primary portion, said ascending line extending substantially perpendicular to the helix line.

5. The parting tool of claim 2 wherein the main body has a first root diameter in the entry portion, a second root diameter in the primary portion, a third root diameter in the separating portion and a fourth root diameter in the calibrating portion, said first, second, third and fourth root diameters being constant, whereas the main body steadily increases in diameter in the transport direction.

6. The parting tool of claim 5 wherein the first root diameter in the entry portion corresponds to a greatest root diameter of the slip bevel, wherein the second root diameter in the primary portion and the third root diameter in the separating portion slightly exceed the first root diameter, and wherein the fourth root diameter in the calibrating portion is greater than the second root diameter in the primary portion and the third root diameter in the separating portion.

7. The parting tool of claim 6 wherein the transition between the entry portion and the primary portion is defined by a fifth root diameter which corresponds substantially to a mean value of the first and second root diameters.

8. The parting tool of claim 1 wherein the main body has a bottom land defined between neighboring coils and configured of one of slightly conical shape and asymmetrically concave shape, at an ascent oriented in the transport direction.

9. The parting tool of claim 2 wherein the coils of the screw thread in the entry portion, primary portion, separating portion and calibrating portion have different top lands.

10. The parting tool of claim 9 wherein the top land in the entry portion and the top land in the primary portion have a pointed end at an acute angle of <90°, and wherein the top land in the separating portion and the top land in the calibrating portion have a flat configuration.

11. The parting tool of claim 10 wherein the main body defines an axis, said transition from pointed top land to flat top land being continuous, said flat top land in the separating portion and in the calibrating portion extending in parallel relationship to the axis of the main body.

12. The parting tool of claim 9 wherein the top land in the entry portion and the top land in the primary portion are configured as a double-pointed tip.

13. The parting tool of claim 9 wherein the top land in the entry portion and the top land in the primary portion have each a one-side pointed tip, with the tips of some of the coils facing the entry zone and the tips of some other coils facing away from the entry zone, and the change in orientation occurring after each 360° with a transition zone.

14. The parting tool of claim 1 wherein the main body has opposite axial ends, and further comprising a first bearing for supporting one axial end and a second bearing for supporting the other axial end of the cutting roller; and at least one calibrating roller disposed in transport direction behind the exit zone of the main body and behind the second bearing.

15. The parting tool of claim 14 wherein the at least one calibrating roller is replaceable.

16. The parting tool of claim 14, and further comprising a second said cutting roller having axial ends supported by first and second bearings and a calibrating roller disposed in transport direction behind the exit zone of the main body of the second cutting roller and behind the second bearing, said cutting rollers arranged in superimposed disposition at formation of a gap for passage of the workpiece, with one of the cutting rollers driven by one shaft and the other one of the cutting rollers driven by another shaft, at least one of the calibrating rollers being positively connected with the shaft of one of the cutting rollers and another one of the calibrating rollers being resiliently and loosely supported on the shaft of the other one of the cutting rollers.

17. The parting tool of claim 16, and further comprising at least one pressure-applying roller for supporting the other one of the calibrating rollers from outside.

18. The parting tool of claim 14 wherein the main body has a root diameter in the separating portion, said calibrating roller defined by a diameter which exceeds the root diameter in the separating portion by at least 2%.

19. The parting tool of claim 14 wherein the calibrating roller is defined by a width which is greater than a width of each produced blank cut from the workpiece.

20. The parting tool of claim 19 wherein the width of the calibrating roller is twice as wide than the width of each of the produced blanks.

21. The parting tool of claim 14 wherein the calibrating roller has a chamfered entry portion.

22. The parting tool of claim 1 wherein the cutting roller is made of multiple parts, with single portions made of different materials.

23. The parting tool of claim 22 wherein the main body is made in the slip bevel and the entry portion of a material of high wear resistance, and wherein the main body is made in the primary portion and the separating portion of conventional hot-working steel.

24. The parting tool of claim 2 wherein the main body is of single-piece construction, with the entry portion, primary portion, separating portion and calibrating portion being applied on the main body as layers of different materials.

25. The parting tool of claim 1 wherein the main body includes in the slip bevel and the entry portion a coat applied through surfacing by welding a powder of a material with high wear resistance.

26. The parting tool of claim 24 wherein the main body has in the entry portion and the calibrating portion a thin layer made of a hard material alloy applied by a sputtering process.

27. The parting tool of claim 26 wherein the hard material alloy is TiAlN.

28. The parting tool of claim 2 wherein the entry portion, primary portion, separating portion and calibrating portion of the main body have different surface structure.

29. The parting tool of claim 28 wherein the calibrating portion has a polished surface structure, said entry portion, primary portion and separating portion having a milled surface structure.

30. A parting tool for continuous chipless separation of identical parts from a rotation-symmetric workpiece, comprising a main body advancing a workpiece in a transport direction from an entry side to an exit side, said main body having a slip bevel at the entry zone and a calibrating portion at the exit zone and a cutting screw disposed between the slip bevel and the calibrating portion and including a screw thread having coils which define a helix line and are configured with an increase in height, said screw thread including in series an entry portion, a substantially cylindrical primary portion, a separating portion and the calibrating portion, whereby the coils in the entry portion, primary portion, separating portion and calibrating portion have different slope angle, with the slope angle determined by a combination of a thickness of the screw thread and a root width between two neighboring coils of the screw thread, wherein the increase in height of the coils correlates to the helix line.

31. A parting tool for continuous chipless separation of identical parts from a rotation-symmetrical workpiece, comprising:
  a pair of cutting rollers disposed above one another at formation of a gap for passage of a workpiece in a transport direction, each said cutting roller including a main body having axial ends defining an entry zone and an exit zone, respectively, said main body having a slip bevel at the entry zone and a cutting screw disposed in succession of the slip bevel and including a screw thread having coils which define a helix line and are configured with an increase in height, said screw thread including in series an entry portion, a substantially cylindrical primary portion in succession of the entry portion, and a separating portion disposed at the exit zone, said entry portion, primary portion and separating portion having different slope angle, with the slope angle determined by a combination of a thickness of the screw thread and a root width between two neighboring coils of the screw thread, wherein the increase in height of the coils correlates to the helix line;
  bearing means for supporting the axial ends of the main body; and
  at least two exchangeable calibrating rollers disposed in transport direction behind the bearing means at the exit zone of the cutting rollers.

* * * * *